US009390029B2

(12) United States Patent
Catrouillet et al.

(10) Patent No.: US 9,390,029 B2
(45) Date of Patent: Jul. 12, 2016

(54) DYNAMIC MANAGEMENT OF RANDOM ACCESS MEMORY

(75) Inventors: Michel Catrouillet, Le Mans (FR); Loïc Pallardy, Rouillon (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 281 days.

(21) Appl. No.: 13/504,174

(22) PCT Filed: Nov. 3, 2010

(86) PCT No.: PCT/EP2010/066760
§ 371 (c)(1),
(2), (4) Date: Apr. 26, 2012

(87) PCT Pub. No.: WO2011/054884
PCT Pub. Date: May 12, 2011

(65) Prior Publication Data
US 2012/0215975 A1    Aug. 23, 2012

(30) Foreign Application Priority Data

Nov. 4, 2009    (FR) ...................... 09 57809

(51) Int. Cl.
*G06F 12/00*    (2006.01)
*G06F 12/12*    (2016.01)
*G06F 9/24*    (2006.01)
(Continued)

(52) U.S. Cl.
CPC ............... *G06F 12/126* (2013.01); *G06F 9/24* (2013.01); *G06F 9/3802* (2013.01); *G06F 12/06* (2013.01); *G06F 12/08* (2013.01)

(58) Field of Classification Search
CPC ....... G06F 12/126; G06F 9/24; G06F 9/3802; G06F 12/06
See application file for complete search history.

(56) References Cited

U.S. PATENT DOCUMENTS 4,719,602 A * 1/1988 Hag et al. ................. 365/189.05
4,839,796 A * 6/1989 Rorden et al. ................. 711/157
(Continued)

FOREIGN PATENT DOCUMENTS

| JP | 8-137513 A | 5/1996 |
|---|---|---|
| JP | 2007-26094 A | 2/2007 |
| WO | 2009/028106 A1 | 3/2009 |

OTHER PUBLICATIONS

Goodman, J. R., and Chiang, M. The use of static column RAM as a memory hierarchy. In Proceedings of the 11th Annual International Symposium on Computer Architecture. 1984, pp. 167-174.*

(Continued)

*Primary Examiner* — Gurtej Bansal
(74) *Attorney, Agent, or Firm* — Patent Portfolio Builders PLLC

(57) ABSTRACT

The invention proposes a method for managing random access memory in a computer system, with said computer system comprising a processor, a first static random access memory, and a second dynamic random access memory, the method comprising the steps of: —receiving at least one instruction to be executed by the processor, —determining a priority level for the execution of the instruction by the processor, and —loading the instruction into the first memory for its execution by the processor if its priority level indicates that it is a high priority instruction, or if not —loading the instruction into the second memory for its execution by the processor.

15 Claims, 6 Drawing Sheets

(51) Int. Cl.
  *G06F 9/38* (2006.01)
  *G06F 12/06* (2006.01)
  *G06F 12/08* (2016.01)

(56) References Cited

U.S. PATENT DOCUMENTS

| | | |
|---|---|---|
| 5,634,135 A | 5/1997 | Hollander |
| 2001/0021959 A1* | 9/2001 | Holmberg et al. ............ 711/104 |
| 2005/0240745 A1* | 10/2005 | Iyer et al. ...................... 711/167 |
| 2006/0184762 A1* | 8/2006 | Cobley .......................... 711/170 |
| 2008/0010414 A1* | 1/2008 | Kailas et al. .................. 711/133 |
| 2008/0126716 A1* | 5/2008 | Daniels ......................... 711/154 |
| 2008/0270758 A1 | 10/2008 | Ozer et al. |
| 2009/0138683 A1 | 5/2009 | Capps, Jr. et al. |
| 2010/0217959 A1* | 8/2010 | Ishikawa ....................... 712/216 |

OTHER PUBLICATIONS

International Search Report issued in corresponding International application No. PCT/EP2010/066760, mailed Mar. 8, 2011.
Written Opinion issued in corresponding International application No. PCT/EP2010/066760, mailed Mar. 8, 2011.
Japanese Office Action in corresponding Japanese Application No. 2012-537394 mailed Apr. 11, 2014.

* cited by examiner

| INSTR | PARAM | |
|---|---|---|
| | SIZ | %SAV |
| I1 | 19 | 5 |
| I2 | 5 | 3 |
| I3 | 4 | 2 |
| I4 | 5 | 2 |

40

| | RQST | SCRAM SIZ | SDRAM SIZ | %SAV | OPER |
|---|---|---|---|---|---|
| t1 | I1 | 0 | 0 | 0 | I1→SCRAM |
| t2 | I2 | 19 | 0 | 5 | I2→SDRAM |
| t3 | I3 | 19 | 5 | 5 | I3→SDRAM |
| t4 | I4 | 19 | 9 | 5 | I1→SDRAM<br>I2→SCRAM<br>I3→SCRAM<br>I4→SCRAM |
| t5 | | 14 | 19 | 7 | |

DYNAMIC MANAGEMENT OF RANDOM ACCESS MEMORY

TECHNICAL FIELD

The present invention relates to computer systems. More particularly, the invention aims to improve the management of the random access memory (RAM) associated with the processors of computer systems, in order to ensure better performance in the execution of computer programs by the system.

TECHNOLOGICAL BACKGROUND

The performance of a computer system depends in particular on the performance of its processor (particularly its computational speed) and on the performance of the random access memory it uses to carry out the operations related to the execution of the instructions it is executing (in particular the memory read and write access times).

In communication systems for example, very high computational performance is expected while maintaining a limited cost and the shortest possible development time for the communication system.

The types of performance expected include the possibility of implementing real-time functionalities, such as for example the management of communication streams with increasingly large volumes of data to be processed. The implementation of these functionalities, however, must not adversely impact the implementation of other functionalities by the communication system. These real-time functionalities require significant computational resources because they involve the processing of a large amount of data within a minimum amount of time.

One solution consists of dedicating a processor to each type of functionality: one processor for real-time applications, and one processor for the other applications. This solution has the advantage of providing access to a large amount of computational power for running all the applications.

This solution significantly increases the cost of the communication system, however.

In addition, when it involves incorporating new real-time features into an existing hardware system that has only one processor, this solution is not a real possibility because it involves completely revising the system structure, which has a cost and involves a long development period.

Another solution consists of increasing the size of the primary memory cache (called the "L1 cache" by persons skilled in the art) in order to dedicate one part of the cache to real-time applications and the other part to the other applications.

It is thus possible to prepare a large volume of data and make them available to the processor very quickly. In fact, by having the data accessible in this cache, the number of instructions needed to obtain the memory from other memories is reduced.

However, this solution involves increasing the size of the components on the silicon of the chip in which the system is implanted. As a corollary, this solution implies a lower clock rate for the system.

In addition, there is a limit to how much the size of the L1 cache can be increased, beyond which the gain in computational speed becomes insignificant because the number of instructions for fetching specific data from the L1 cache becomes too high.

SUMMARY OF THE INVENTION

There is therefore a need to improve the performance of computer systems while ensuring a limited cost and a reasonable development period, particularly when adding new functionalities to an existing platform.

For this purpose, a first aspect of the invention proposes a method for managing random access memory in a computer system, with the computer system comprising a processor, a first static random access memory, and a second dynamic random access memory, said process comprising the steps of:

receiving at least one instruction to be executed by the processor, determining a priority level for the execution of the instruction by the processor, and loading the instruction into the first memory, for execution by the processor if its priority level indicates that this is a high priority instruction, or if not loading the instruction into the second memory, for execution by the processor.

The memories in question can be different than a cache.

Dynamic random access memory can be defined as random access memory requiring the refreshing of data. Static random access memory can be defined as random access memory not requiring any refresh.

Static random access memory is generally very fast but has a large silicon footprint. Dynamic random access memory is generally cheaper and less voluminous.

For example, the first random access memory is SCRAM ("Static Column Random Access Memory"), and the second random access memory is SDRAM ("Synchronous Dynamic Random Access Memory").

SCRAM memory allows fast loading and unloading of instructions. In addition, SCRAM memory can easily be included in different types of circuits.

For example, the first static random access memory is memory internal to the processor, and the second dynamic random access memory is memory external to the processor. Having the memory close to the processor allows faster data transfers.

According to the invention, instructions are dynamically loaded into and unloaded from the first and second random access memory according to the priority that is assigned to the instructions.

The priority assigned to the instructions can depend on the context of the execution of a particular function by the computer system.

As a further example, the priority given to the instructions can come from the fact that these are instructions from computer code often used by a particular function.

The random access memory management of the invention allows increasing the computational power of the processor, and accelerating the execution of computer programs without extra costs in hardware development.

In some embodiments, the method additionally comprises the steps of:

receiving a set of instructions to be executed by the processor, defining, within the set of instructions, a first and a second subset of instructions as a function of a priority level for execution by the processor determined respectively for the instructions, with the first subset comprising priority instructions whose execution priority level indicates that they have priority over the instructions of the second subset, loading instructions of the first subset into the first memory for their execution by the processor, and loading instructions of the second subset into the second memory for their execution by the processor.

In some embodiments, the instructions are loaded/unloaded between the first and second random access memory as their priority level changes.

Thus, depending on the context of the processor utilization, an instruction can change from a high priority level to a lower priority level or vice versa.

For example, an instruction can be found to have a lower priority than a newly called instruction to be executed by the processor.

It can be arranged that a set of instructions associated with the implementation of a function by the computer system is identified.

For example, depending on the "use case", certain instructions which are used often can be given preference.

For example, when a telecommunications application is started up, the execution of the application can be accelerated by giving priority to the instructions frequently executed by the application, making them available to the processor in the static random access memory (SCRAM memory for example).

In some embodiments, the instructions are associated with at least one priority parameter, and the determination of the priority level of the instructions is based on their respective priority parameters.

This allows, for example, rapid determination of the priority level of an instruction, by reading from a table comprising the parameter.

For example, a priority parameter is representative of a processor load savings.

For example, to determine this load savings, the number of clock cycles per instruction executed by the processor when the instruction is stored in the first and second memory is compared.

For example, a priority parameter is representative of the amount of memory occupied by the instruction.

In some embodiments, the storage of instructions in the first memory is determined by compromising between the size of the instructions and the processor load savings that they would provide.

As the size of the static random access memory is limited, its optimum usage depends on a comparison of the amount of available memory and the processor load savings provided by storing instructions within it.

For example, the parameter associated with the instructions has a fixed value.

A table can be provided that stores, for each instruction, the parameters associated with it.

As a further example, the parameter is associated with the instructions dynamically, based on a learning algorithm which assigns a priority parameter based on a processor load savings measurement associated with each instruction.

To establish the parameter dynamically, a dynamic measurement of the number of operations necessary to execute the instruction can be provided. In another variation, there can be dynamic access to the processor load level at each moment in the execution of the instruction.

In some embodiments, the storage of instructions in the first memory is done according to a learning algorithm that also optimizes usage of the first memory.

For example, the algorithm is an adapting algorithm and can identify an association of instructions which, when stored together in the static random access memory, provide good optimization of the static random access memory.

Other aspects of the invention also allow for:
 a computer program comprising instructions for implementing a method according to the invention, when the program is executed by a resource manager of a computer system;
 a computer system according to the invention; and
 an integrated circuit comprising a system according to the invention.

The computer program, the system, and the integrated circuit present at least the same advantages as those provided by the process according to the first aspect of the invention.

BRIEF DESCRIPTION OF THE DRAWINGS

Other features and advantages of the invention will become apparent from reading the following description. This description is purely illustrative and is to be read in light of the attached drawings, in which:

FIG. 4 illustrates the management of random access memory according to an embodiment;

DETAILED DESCRIPTION OF EMBODIMENTS

Figure 1:
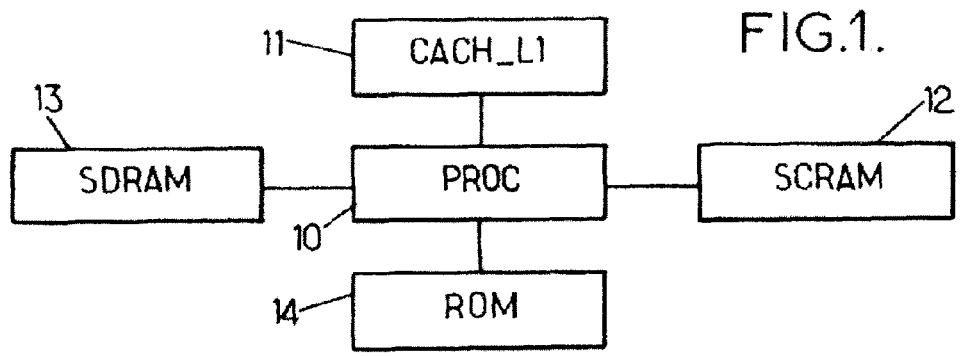
FIG. 1 schematically illustrates a processing unit structure of a computer system according to an embodiment of the invention.

A processing unit structure of a computer system is described very schematically, with reference to FIG. 1.

In this structure, there is a processor 10 in charge of executing more or less basic instructions in the context of the more general execution of a computer program.

The processor 10 has different types of memory available for this purpose.

It has several cache memories available to it. This type of memory is used to store data temporarily that are useful for the execution of the instructions. This type of memory can store data to be processed such as the operands of operations to be executed by the processor, or the identification of operations to be performed. This memory has very good performance in terms of access time, and is used for copying the data used to bring them close to the processor.

Among such cache memory is the "L1" cache 11. This is the cache closest to the processor, and is also the highest performance memory in terms of access time. This type of memory is generally very costly and therefore its size is generally limited. Also among such cache memory is the static random access memory 12. This random access memory also has very good performance, although inferior to that of the L1 cache. The cost of this type of memory allows the possibility of providing more of it than in the L1 cache.

The processor 10 also has dynamic random access memory 13 available to it. This type of random access memory generally requires regularly refreshing the data, but takes up very little area on the silicon and is inexpensive because its structure is very simple.

Lastly, the processing unit has read-only memory 14 for storing data in a lasting manner.

In order to implement a computer program for example stored in the read-only memory 14, the processing unit copies certain parts of the computer code into the random access memory or cache in order to speed up the execution of the program.

It is proposed to optimize the use of the random access memory available to the processor in order to further accelerate the execution of the program, in particular the management of the static 12 and dynamic 13 random access memories.

To illustrate the proposed optimization, a context for implementing the invention is described with reference to FIGS. 2a and 2b.

Figure 2A:
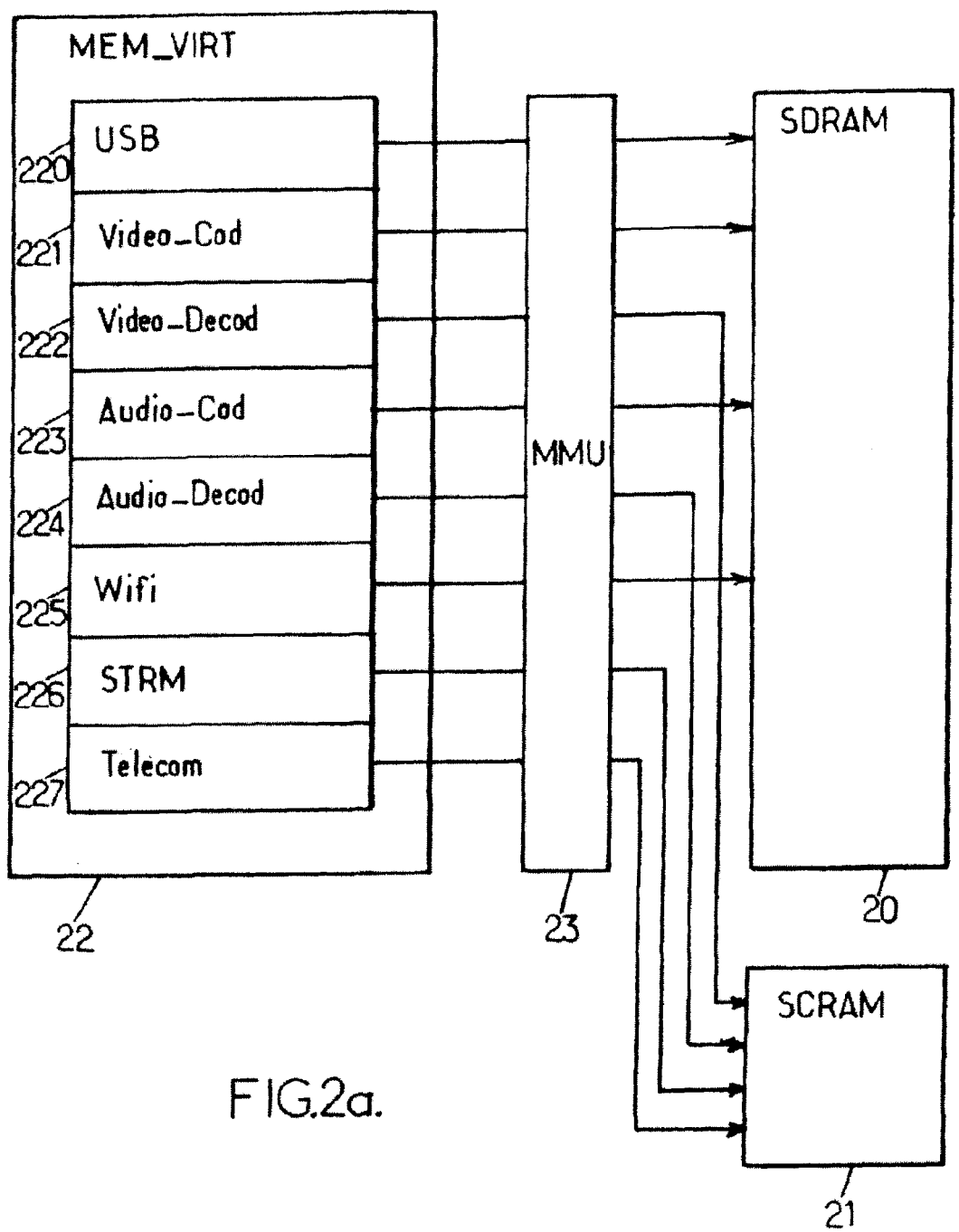
FIGS. 2a and 2b illustrate the architecture of a system according to embodiments of the invention.
Figure 2B:
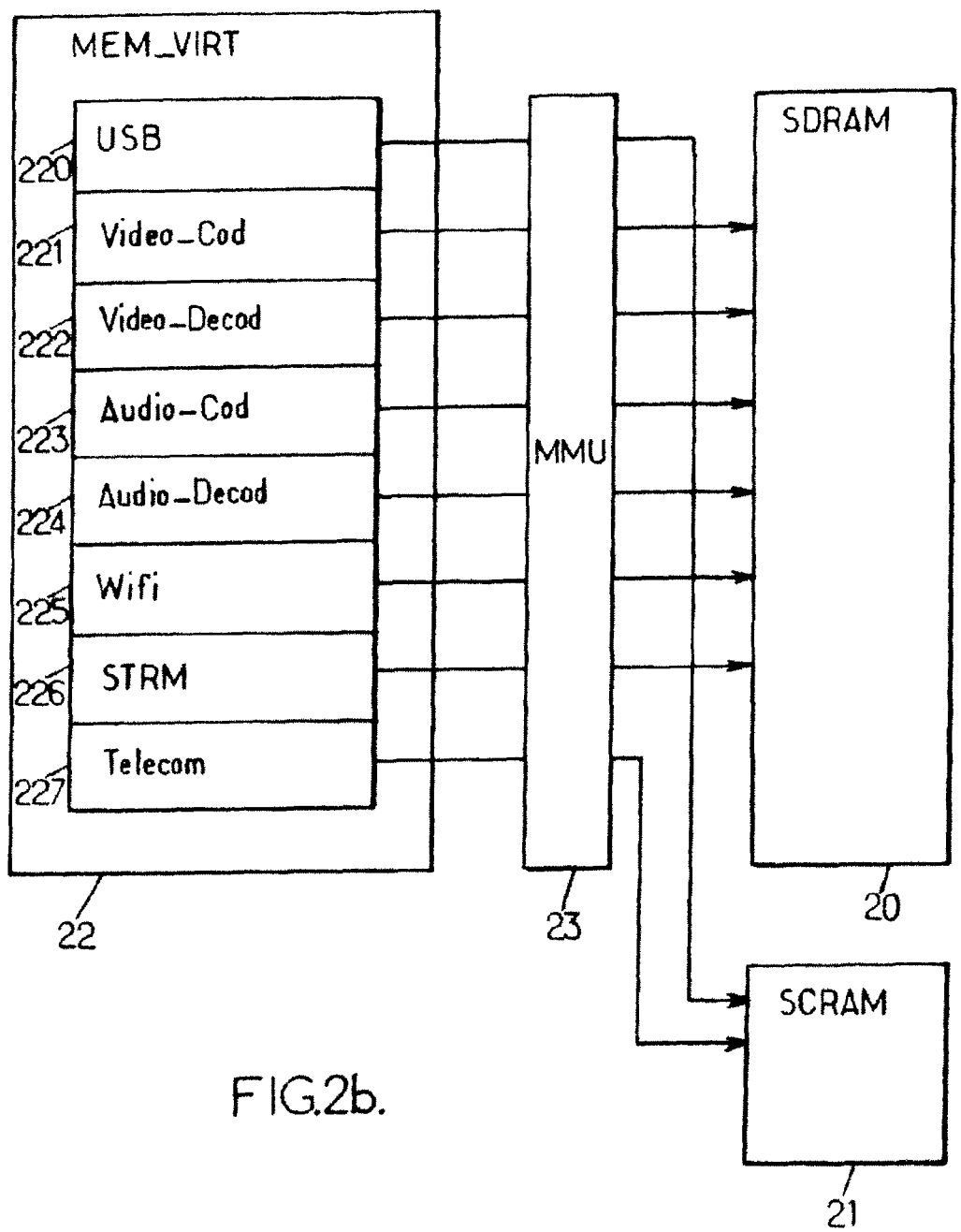

In FIG. 2a, a dynamic random access memory 20 and a static random access memory 21 are represented.

It is assumed that the information system must execute a computer program. For this purpose, it knows about a certain number of instructions (or parts of code) that will be executed. These instructions are identified in a virtual memory 22. This virtual memory represents a table which comprises the addresses in the read-only memory where the instructions are stored.

A memory management unit MMU 23 is in charge of translating virtual addresses into physical addresses in the random access memory at the appropriate moment. This unit handles such translations for the different types of memory in the system (RAM or ROM).

In the example illustrated in FIG. 2a, among the instructions to be executed there is an instruction for managing a communication on a USB port 220, an instruction for video encoding 221, an instruction for video decoding 222, an instruction for audio encoding 223, an instruction for audio decoding 224, an instruction for managing a WiFi communication 225, an instruction for managing a stream of data 226, and an instruction for implementing telecommunications 227.

In the example illustrated by FIG. 2a, it is assumed that the processing unit is to implement the reception of a video stream.

For this purpose, according to the invention, the instructions critical to performing said reception are identified in the virtual memory. The critical applications are for example the instructions which if their execution was accelerated would allow performing the video stream reception function faster.

Then the instructions for video decoding 222, audio decoding 224, data stream management 226, and implementing communications 227 are identified.

Next the instructions 222, 224, 226, and 227 are stored in the static random access memory 21, and the other instructions in the dynamic random access memory 20.

The reception of the video stream, which in this example is judged to have priority, is thus carried out while benefiting from the performance of the static random access memory, while the other functionalities carried out by the processing unit only use the dynamic random access memory.

This accelerates the execution of the video stream reception.

In another example illustrated in FIG. 2b, the same elements are found as were described with reference to FIG. 2a.

This time it is assumed that the computer system is to implement a modem function on a USB port.

The critical instructions for implementing this function are identified. In the example illustrated by FIG. 2b, it is assumed that the critical instructions are the instructions 220 and 227.

The instructions are then loaded into the memory 21, while the instructions 222, 224, and 226 are unloaded from the memory 21 and loaded into the memory 20.

This accelerates the execution of the modem function on the USB port, which in this example is considered to have priority over the video stream reception function which previously had priority.

The management of the random access memory can be executed by a resource manager.

Figure 3:
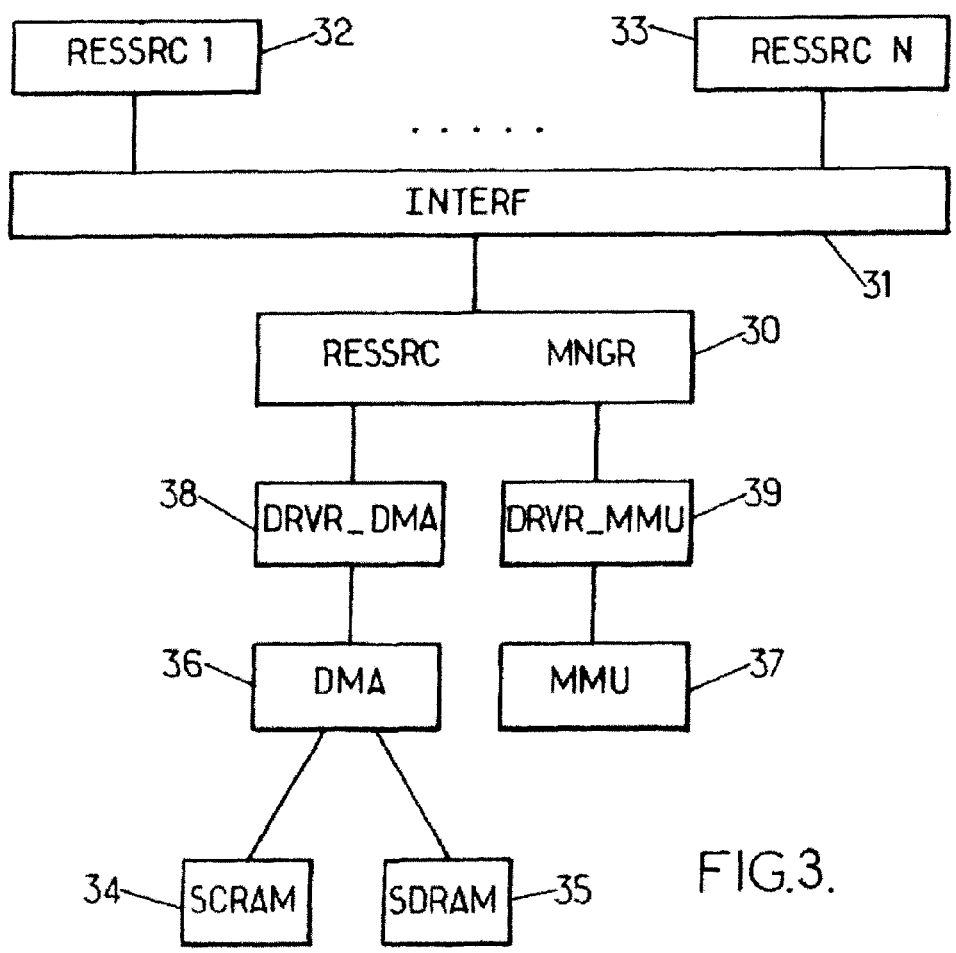
FIG. 3 illustrates a resource manager according to an embodiment of the invention.

Such a resource manager is represented in FIG. 3.

The resource manager 30 is connected via an interface 31 to various resources 32 and 33. These resources are, for example, files storing the computer code for functions such as telecommunications, multimedia, connectivity, or other functions. For example, the instructions for the examples in FIGS. 2a and 2b come from these resources.

The resource manager is in charge of storing, according to the computer program to be executed, the instructions for the resources into the static 34 and dynamic 35 memories.

For this purpose, it has access to a Direct Memory Access Unit 36 and a Memory Management Unit 37.

As has already been mentioned, the Memory Management Unit knows the virtual memory addresses of the instructions to be executed and is in charge of translating these virtual addresses into the physical addresses in the memories 34 and 35. The Direct Memory Access Unit handles the copying of data into the dynamic random access memory and static random access memory, as well as the exchange of data between these two memories.

The resource manager 30 controls the Direct Memory Access Unit 36 and Memory Management Unit 37 via the respective drivers 38 and 39.

The random access memory management is illustrated according to one embodiment, with reference to FIG. 4.

The table 40 represents a table showing the correspondence between four groups of instructions I1, I2, I3, and I4 (INSTR column) and their respectively associated set of priority parameters (PARAM column).

With each instruction is associated a size in kilobits for example (under the SIZ column), and a processor load savings as a percentage for example (under the % SAV column).

To obtain the processor load savings parameter, one can, for example, calculate the ratio of the difference between the execution time for the instruction when the instruction is executed from the dynamic RAM and when it is executed from the static RAM on the one hand, and of the execution time for the instruction when the instruction is executed from the dynamic RAM on the other.

As another example, one can calculate the ratio of the difference between the number of operations for the processor to execute the instruction when the instruction is executed from the dynamic RAM and when it is executed from the static RAM on the one hand, and of the number of operations for the processor to execute the instruction from the dynamic RAM on the other.

Thus the group of instructions I1 has a size of 19 kB and allows a processor load savings of 5%, the group of instructions I2 has a size of 5 kB and allows a processor load savings of 3%, the group of instructions I3 has a size of 4 kB and allows a processor load savings of 2%, and the group of instructions I4 has a size of 5 kB and allows a processor load savings of 2%.

It is assumed that there are 20 kB of static RAM available.

The table 41 represents a sequence of operations for optimizing the static RAM according to one embodiment.

At time t1, the execution of the group of instructions I1 is requested (RQST column). It is assumed that the static RAM and the dynamic RAM are empty (columns SCRAM SIZ and SDRAM SIZ). Optimization has not yet begun and therefore the processor load savings is still zero (% SAV column).

Alternatively, one can initially store all the instructions in dynamic RAM, and in this case only the static RAM is empty.

As the static RAM is empty, and the group of instructions I1 is of a size that can be stored in the static RAM and thus reduce the processor load, this instruction is loaded into the static RAM (OPER column).

At time t2, the execution of the group of instructions I2 is requested.

This group of instructions has a size of 5 kB. However, only 1 kB remains free in the static RAM. Therefore the groups of instructions I1 and I2 are examined to see which provides the greatest processor load savings. In this example it is the group I1.

The group of instructions I1 is therefore kept in the static RAM, and the group of instructions I2 is stored in the dynamic RAM. Then the group of instructions I2 is copied into the dynamic RAM and the MMU is consequently reconfigured. If the groups of instructions were stored by default in the dynamic RAM as mentioned above, nothing is done.

At time t3, the execution of the instruction I3 is requested.

This group of instructions has a size of 4 kB. However, only 1 kB remains free in the static RAM. Therefore the groups of instructions I1 and I3 are examined to see which provides the greatest processing load savings. In this example it is the group I1.

Also examined is whether storing the groups of instructions I2 and I3 together in the static RAM instead of the group of instructions I1 would provide better load savings. In this example such is not the case, because storing these two instructions provides a processor load savings of 5% which is exactly the same savings provided by storing the group of instructions I1 in the static RAM. Even if the two instructions occupied less space, it would not be advantageous to store them in the static RAM because the operation of moving the groups of instructions I1 and I2 would increase the processor load.

Therefore the group of instructions I1 is kept in the static RAM, and the group of instructions I3 is stored in the dynamic RAM.

At time t4, the execution of the group of instructions I4 is requested.

This group of instructions has a size of 5 kB. However, only 1 kB remains free in the static RAM. Therefore the groups of instructions I1 and I4 are examined to see which provides the greatest processor load savings. In this example it is the group I1.

Also examined is whether storing several groups of instructions from among the groups I2, I3 and I4 together in the static RAM instead of group I1 would provide better load savings. In this example such is the case, because storing these three groups provides a processor load savings of 7% (3+2+2) which is greater than the savings provided by storing the group I1 in the static RAM, which is 5%. In addition, the size of the three groups combined is 14 kB which can be accepted by the static RAM.

It is assumed that the data transfers between the memories do not adversely impact the gain in processor load savings. The group of instructions I1 is therefore moved from the static RAM to the dynamic RAM, the groups of instructions I2 and I3 are moved from the dynamic RAM to the static RAM, and the group of instructions I4 is stored in the static RAM.

At time t5 we therefore have instructions stored in the static RAM such that the groups of instructions allow an optimum savings of the processor load.

Figure 5:
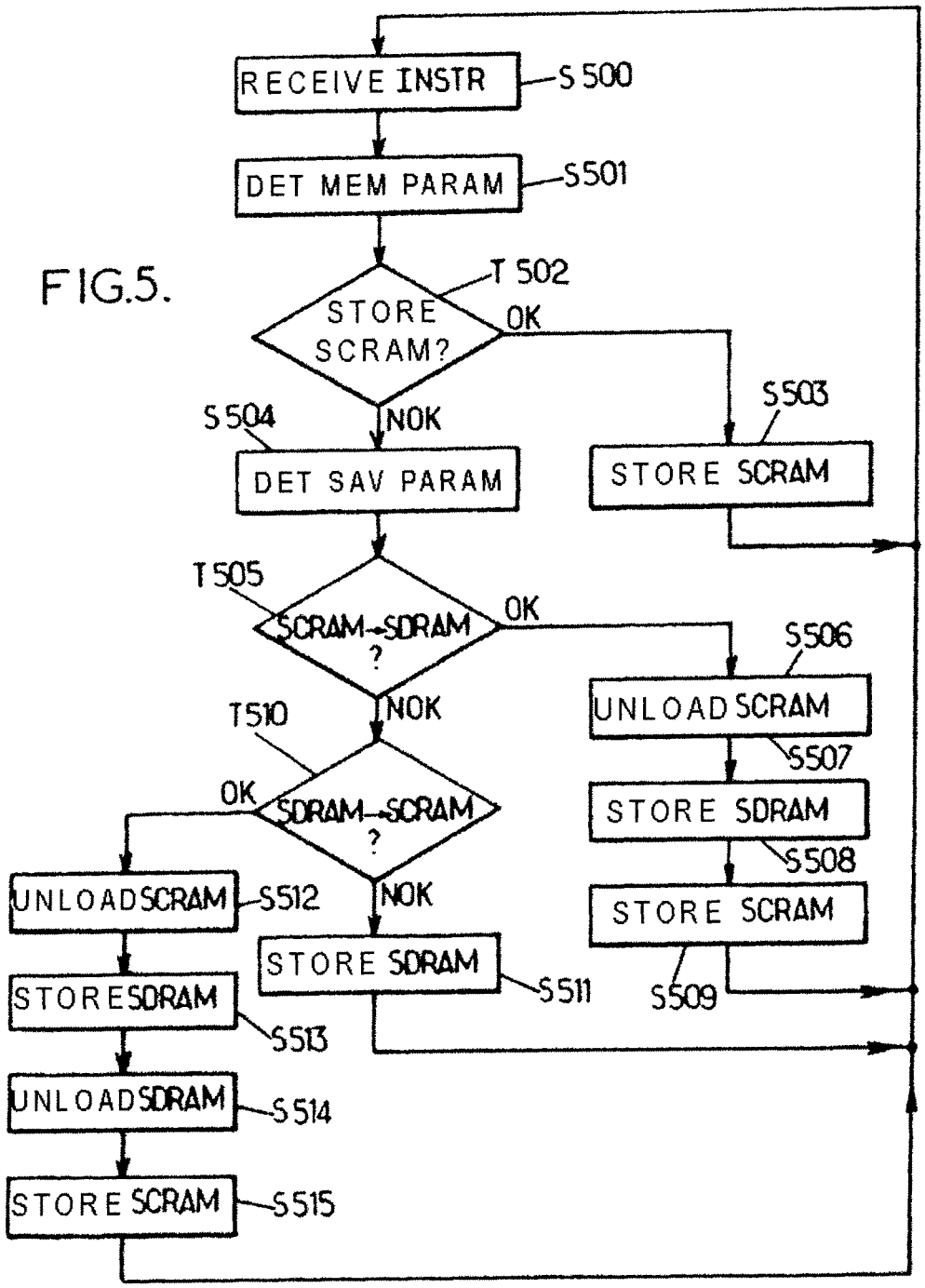
FIG. 5 is a flow chart of steps implemented in a method according to an embodiment of the invention.

The steps performed in a method of one embodiment are presented with reference to FIG. 5.

In this embodiment, the use of the static RAM is optimized according to an instruction size parameter and a processor load savings parameter, such as in the example described with reference to FIG. 4.

During a first step S500, an instruction is received to be executed by the processor. It is attempted to determine whether this instruction is to be loaded into the static RAM or the dynamic RAM.

During the step S501 a parameter associated with the instruction is determined, representative of the size this instruction occupies in memory. For example, this parameter is read from a table such as was described with reference to FIG. 4.

During the test T502, it is established whether the parameter representative of the size this instruction occupies in memory allows its direct storage in the static RAM. If such is the case, for example if there is enough space in the static RAM, the instruction is stored in the static RAM during the step S503.

Otherwise, for example if there is not enough space in the static RAM, in the step S504 a parameter associated with the instruction is determined, representative of a processor load savings offered by storing the instruction in the static RAM. For example, this parameter is read from a table such as was described with reference to FIG. 4.

Then, during the test T505, it is determined whether the instruction has a better parameter representative of a processor load savings than another instruction already stored in the static RAM.

If such is the case, the instruction already present in the static RAM is unloaded during the step S507, then it is stored in the dynamic RAM during the step S508. In addition, the instruction received during the step S500 is stored in the static RAM during the step S509.

If the test in the step T505 is negative, the process continues on to the test T510 in which it is determined whether instructions exist, in the dynamic RAM, whose parameters representative of a processor load savings when added together offer a better parameter representative of a processor load savings than the one for another instruction already stored in the static RAM.

If such is the case, the instruction is unloaded from the static RAM during the step S512 then it is stored in the dynamic RAM during the step S513.

Next, the instructions found during the step T505 are unloaded from the dynamic RAM during the step S514. These instructions are then stored in the static RAM during the step S515.

If the test in the step T510 is negative, the instruction received during the step S500 is stored in the dynamic RAM during the step S511.

Once the steps S515, S511, S503 and S509 are completed, the process returns to the step S500 to receive a new instruction to be executed.

To determine the parameter representative of a processor load savings or to update a table of parameters as was described with reference to FIG. 4, a learning algorithm can be implemented.

Figure 6:
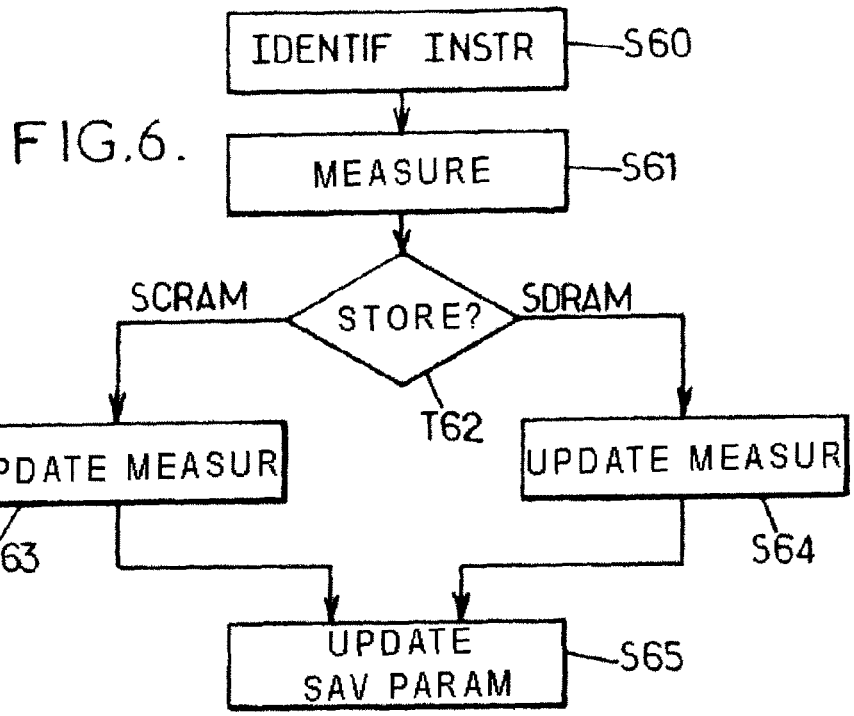
FIG. 6 is a flow chart of steps implemented in a method for setting a priority parameter according to an embodiment of the invention.

Such an algorithm is now described, with reference to FIG. 6.

During the initial step S60 an instruction to be executed is identified, then during the step S61 the execution time by the processor is measured (or the number of operations for the processor to execute the instruction, as already mentioned above).

Depending on whether the instruction was executed from the static or the dynamic RAM (test T62), a value for the execution time in the static RAM (step S63) and in the dynamic RAM (step S64) is updated. For example, the execution time is an average of the time for the processor to execute the instruction.

Then, during the step S65, the parameter representative of a processor load savings is determined. For example, the ratio is determined of the difference between the values obtained during steps S63 and S64 on the one hand, and of the value obtained during the step S64 on the other. To find this ratio, one can verify beforehand that the values were obtained under the same conditions, for example the instructions were executed in the same context (for example while running the same computer program), or if the values obtained are averages, that these averages were calculated using the same number of values.

Figure 7:
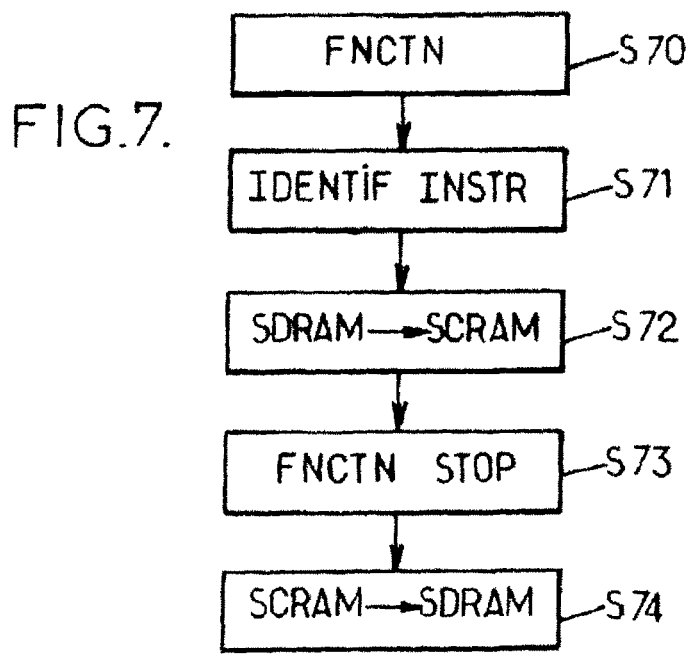
FIG. 7 is a flow chart of steps implemented in a method for setting a priority parameter according to another embodiment of the invention.

The steps of a method according to another embodiment are now described with reference to FIG. 7.

In this embodiment, the instructions are stored in the static RAM or the dynamic RAM depending on a function with which they are associated.

Thus, if giving priority to this function is desired, all the instructions associated with it are stored in the static RAM.

During the step S70, a function or code of a computer program is identified. For example, the execution of this function is to be accelerated.

Then, during the step S71, a set of instructions associated with this function is identified.

The identified instructions are then stored in the static RAM during the step S72.

During the step S73, it is detected that the function has been executed, or that the function is no longer to be accelerated. During the step S74, the instructions are then unloaded from the static RAM to be for example stored in the dynamic RAM. As a further example, the instructions are simply replaced with other higher priority instructions.

A computer program of the invention can be realized according to a general algorithm deduced from the general flowchart in FIGS. 5, 6, and/or 7, and the present description.

An integrated circuit of the invention can be realized by techniques known to a person skilled in the art, in order to be configured to implement a process of the invention. For example, a system of the invention can be realized in an integrated circuit in the form of a System on Chip (SoC).

For example, a system of the invention can be implanted in a terminal or other communication equipment to allow better communication performance by these devices.

The invention has been described and illustrated in the present detailed description and in the Figures. The invention is not limited to the embodiments presented here. Other variations and embodiments can be deduced and implemented by a person of ordinary skill in the art upon reading the present description and the attached Figures.

In the claims, the term "comprise" does not exclude other elements or other steps. The indefinite article "a" does not exclude the plural. A single processor or several others together can be used to implement the invention. The various characteristics presented and/or claimed can advantageously be combined. Their presence in the description or in different dependent claims does not exclude this possibility. The reference labels are not to be considered as limiting the scope of the invention.

The invention claimed is:

1. A method for managing random access memory (RAM) in a computer system, with said computer system having a processor, a static random access memory, and a dynamic random access memory, the method comprising:

receiving at least one instruction to be executed by the processor;

determining a priority level for executing each instruction among the at least one instruction by the processor, based on at least one parameter stored in a table as corresponding to the instruction;

loading the at least one instruction into the static memory for execution by the processor if the priority level indicates that the at least one instruction is a high priority instruction, and there is enough space in the static memory to load the at least one instruction;

loading the at least one instruction into the dynamic memory for execution by the processor if the priority level does not indicate that the at least one instruction is a high priority instruction; and if the priority level indicates that the at least one instruction is a high priority instruction, and there is not enough space in the static memory, comparing the priority level for executing the at least one instruction with priority levels of instructions already stored in the static memory, respectively, if the priority level for executing the at least one instruction is higher than the priority level of one of the instructions already stored, unloading said one of the instructions already stored from the static memory and then loading the at least one instruction in the static memory, and if the priority level for executing the at least one instruction is lower than the priority levels of said instructions, loading the at least one instruction in the dynamic memory.

2. The method according to claim 1, wherein the at least one instruction is loaded/unloaded between the static and the dynamic memory as a function of a change in the priority level for executing the at least one instruction by the processor.

3. The method according to claim 1, additionally comprising:

receiving a set of instructions to be executed by the processor;

defining, within the set of instructions, a first and a second subset of instructions by comparing priorities of the instructions with one another, the first subset including instructions whose execution priority levels are higher than execution priority levels of instructions in the second subset;

loading the first subset of instructions into the static memory for execution by the processor; and loading the second subset of instructions into the dynamic memory for execution by the processor.

4. The method according to claim 3, wherein the set of instructions is associated with implementing a function by the computer system.

5. The method according to claim 1, wherein the at least one instruction is associated with at least one priority parameter, and wherein the determining of the priority level for executing the at least one instruction is based on the at least one priority parameter.

6. The method according to claim 5, wherein the at least one priority parameter is representative of an amount of memory occupied by the at least one instruction.

7. The method according to claim 5, wherein the at least one parameter associated with the at least one instruction has a fixed value.

8. The method according to claim 5, wherein the at least one priority parameter is associated with the at least one instruction in a dynamic manner according to a learning algorithm which assigns the at least one priority parameter based on a processor load savings measurement.

9. The method according to claim 5, wherein the loading of the at least one instruction in the static or the dynamic memory is done according to a learning and optimization algorithm that optimizes how the static memory is filled.

10. The method according to claim 5, wherein the dynamic memory is a Synchronous Dynamic Random Access Memory (SDRAM).

11. The method according to claim 5, wherein the at least one priority parameter is representative of processor load savings caused by storing the at least one instruction in the static memory compared to storing the at least one instruction in the dynamic memory.

12. The method according to claim 11, wherein storing the at least one instruction in the static or the dynamic memory is determined by compromising between a size of the at least one instruction and processor load savings caused by storing the at least one instruction in the static memory compared to storing the at least one instruction in the dynamic memory.

13. A non-transitory computer readable storage media storing instructions which, when executed by a resource manager of a computer system having a processor, a static random access memory, and a dynamic random access memory, make the computer system perform a method according to claim 1.

14. A computer system comprising:
   a processor,
   a static random access memory,
   a dynamic random access memory, and
   a management unit configured to implement a method according to claim 1.

15. An integrated circuit comprising the system according to claim 14.

* * * * *